United States Patent Office 2,821,477
Patented Jan. 28, 1958

2,821,477

JELL COATED FOOD ARTICLE AND PROCESS OF MAKING

John H. Forkner, Fresno, Calif., assignor to Pillsbury Mills, Inc., Minneapolis, Minn., a corporation of Delaware No Drawing. Application December 21, 1955
Serial No. 554,409

15 Claims. (Cl. 99—129)

This invention relates to an article of food having a jell coating adhered thereto, and to a process for making such food article.

The jell material which is comprehended in this application is of similar formula to that used commercially in the form of gumdrops, fruit slices or sliced jellied squares. Jells of this nature are defined as semi-transparent, easily melted food preparations having soft and somewhat plastic homogeneous consistency owing to the presence, with granulated sugar, corn sugar and water, of the common jell-producing materials typified as gelatins, pectins, gum tragacanth, gum arabic, agar agar, Irish moss and starch, the latter being used to great extent in the production of ordinary gumdrops. Some of the foregoing agents require conversion in the presence of an acid. All of them, however, are characterized by a fairly high moisture content, usually from 22% to 24% moisture and by an extremely plastic, sticky and unworkable nature when freshly prepared. The conventional way of handling and producing jell products such as gumdrops requires either the depositing of a jelled mass upon a cooling slab and subdividing after it has become cured or casting the plastic jell material in mold cavities formed in dry starch. In either case, the curing period requires drying and setting and days, or even weeks, may be consumed in thus preparing the jell substance for further handling. It is common practice in the production of conventional gumdrops to steam the product while still in the partially cured stage, then immediately coating with granulated sugar which will absorb some of the moisture and prevent similar gumdrop products from adhering to each other. The longer the jelled product cures, the less sticky it becomes.

In the casting of gumdrop articles, the plastic material is merely dropped from a spout nozzle or the like into the position in which it will ultimately cure. Because of the extreme stickiness of the fresh material, any handling thereof before curing, as by means of automatic enrobing equipment, merely results in a hopeless adherence of the material in the contacting parts resulting in complete inoperability of the apparatus. Because of this very sticky nature, such jell material does not easily lend itself to exterior coating of food particles which can be thereafter handled. To the best of my knowledge, no one prior to my invention has ever successfully coated completely relatively small food particles such as pieces of fruit, nuts, confection and the like with jell material and, hence, the present conventional methods of coating do not adapt themselves to the application of sticky material such as the herein-described jell-producing material.

The conventional methods of coating food particles include the panning process and enrobing process. The former requires a fluid coating to be applied to particles which are being tumbled in a rotating drum or pan. The particles are alternately coated and dried, first with the fluid material and then with a drying material such as sugar. Characteristic of such process is the panning of previously cured gumdrop particles to produce conventional jellybeans. It is to be noted, however, that the jellybean has its interior composed of the jell material while the exterior is a harder sugar coating.

Enrobing is a process by which candy centers such as fondant are chilled and coated with molten chocolate which, in turn, solidifies in place. Here, again, the centers may be made of jell materials such as gumdrops, but the enrobing material itself is of a nature such as the aforementioned chocolate. Any attempt to either conventionally pan or enrobe food particles with an exterior coating of gumdrop material or any of the other jell-producing foods merely results in a hopeless sticking together of the particles.

My invention, however, contemplates the production of jell-coated food objects and has as a general objective, the provision of an easily preserved edible article, useful for eating directly or incorporating with other foods, wherein the outer coating consists of a jell-producing food made from gelatin, pectin, starch, gum tragacanth, gum arabic, agar agar, Irish moss and the like.

Another important object of the invention is to provide a novel process by which such coating may be applied to food articles of widely varying character such as dried fruit particles, nuts, and confections, the jell being rendered workable for the purpose of adhering to the food objects.

A further object of the invention is to provide a novel edible article having a pleasant taste and appearance wherein the inner portion of the article comprises a food object of relatively expensive nature and the outer coating comprises a relatively less expensive jell-type material.

It is a further object of the invention to provide a process whereby jell material is handled in a non-sticky condition even though uncured and is caused to adhere to food objects, following which the jell coating is permitted to cure without causing similar coated articles to agglomerate.

The first step in my process is the preparation of the jell-producing food. I have successfully employed conventional formulas for each of the previously identified jell-producing material and may vary the formulation thereof in an infinite number of ways so long as the ultimate product will lend itself to curing and so long as the uncured jell has the characteristic stickiness. It is to be noted that the high presence of sugar that can be formulated into a jell such as pectin jell-base will place a surface of preservative when the jell is coated on a food object and thus will itself act as a mold-inhibitor to prevent deterioration of the coated article even when it is subsequently employed as an additive to other food products such as baked goods.

In the preparation of the initial jell formula, I may also incorporate various flavoring additives and can further assist the mold-resisting properties of the jell by adding an inhibitor such as benzoate of soda for special adaptation as will be set forth more fully later on in this specification. Another additive which I have successfully utilized as an ingredient of my original jell-producing substance is sodium bisulphite, the advantage of which will be set forth and considered under the discussion of special uses for my jell-coated food articles.

One typical procedure which I utilize includes as an initial step the preparation of an ordinary jell-producing food of the following formula:

| | | |
|---|---|---|
| Granulated sugar | pounds | 15 |
| Glucose corn sugar | do | 7½ |
| Starch | do | 2¼ |
| Citric acid | ounces | 3 |
| Water | pounds | 24 |

This formula is then boiled for five minutes and is concentrated to 80% solids in a heated agitating vacuum kettle operating under a vacuum of 27 inches. The material thus prepared is deposited in slabs one-half inch thick and four inches wide by eight inches long on a bed of starch. These slabs are subjected to circulating air at a temperature of 30° Fahrenheit for approximately five minutes which will cool and set them to where they may be readily removed from the starch bed and placed in a sharp freezing atmosphere where the temperature is further reduced to around −48° Fahrenheit. The slabs thus chilled require only a few minutes to become completely frangible. In some instances, I prefer to partially cure the jell slabs before chilling them, it being understood that the greater the degree of curing time, the less tackiness will be present in the jell material. For best results in coating, I prefer that the jell particles be completely uncured or only partially cured. It is understood, of course, that I may specially treat cured gumdrop particles or the like so as to temporarily render them tacky or sticky for the purpose of my process.

Following the chilling or freezing of the jell-producing material, I then convey the brittle slabs into a pre-breaker which subdivides the slabs into chunks about one inch square. These chunks are then maintained at low temperature and are fed into a comminuter on the order of a simple horizontal hammer mill utilizing cutter elements and rotating at approximately 3600 R. P. M. The hammer mill screen employed had ⅜ inch screen openings. Under the conditions recited, it was noted that the bulk of the comminuted cold particles were of a size approximately ⅟₁₆ of an inch thick. It is understood, of course, that the size may be varied considerably and that the physical quality of the jell material may cause some deviation in the particle size as produced from the hammer mill. When thus subdivided, the jell particles were found to be freely flowable provided they were maintained at low temperature conditions. I have experimented with Dry Ice wherein the Dry Ice is proportioned approximately 2% of the weight of the jell material and have permitted the Dry Ice to carry through with the product during comminution. Such expedient is useful in that the low temperature can be easily maintained and controlled.

The food object to be coated with the jell material may be of many different varieties, sizes and shapes, whole or subdivided. I have successfully utilized such widely variant objects as almonds, walnuts, pecans, figs, dried apple pieces, dates, maraschino cherries, and have even utilized the top of an entire cake as my food object to be coated. As a separate operation, the food object to be coated by my comminuted jell material is then heated and the temperature employed I have found to be capable of variation within wide limits. In all cases, however, the food object must be warmed to a temperature at which the jell particles will stick on contact. In other words, the food object should be warmed to a temperature which will cause the comminuted jell material to melt, at least at the contacting interfacial surface, and thereby cause individual jell particles to adhere to the object. In some instances, I may completely defrost the jell particles as, for example, when they are applied to the top of a warm cake and, in other instances, I prefer merely to momentarily melt the contacting surface without permitting the outer surface of each of the jell particles to soften or become sticky. In the example presently cited, using food objects such as above mentioned, I heat them initially to around 140° Fahrenheit. The temperature is then permitted to level off at 128° Fahrenheit at the time of deposit into the relatively cooler jell particles. The jell particles are greatly in excess of the amount required to cover the surface of the food objects instantaneously in contact therewith. The jell particles are maintained close to a temperature of −40° Fahrenheit and the warm food objects are introduced in the excess mass of jell particles while tumbling or agitating the entire mixture. The frozen jell material, being in excess, prevents the warm food objects from touching in a manner such as to adhere to common particles and thereby agglomerate. The excess cold jell material which is not adhered to the warm food objects serves to chill those particles which were momentarily melted and stuck to the surface of the objects. The continued transfer of heat from each of the food objects rapidly chills each of the food objects together with its adhered coating to a temperature below that at which any stickiness can exist and under such conditions, there is no further danger of agglomeration of the separately coated food objects. In some instances, I may desire to get special effects by utilizing controlled sizes of the comminuted and cold jell particles. For example, I may intersperse large particles with very small particles to acquire a grainy effect. By utilizing comparatively large jell particles and controlling the conditions of application, I can also produce a discontinuous coating in which the original surface of the food object may be seen between the adhered granules or particles. In general, I have found that the food object to be coated must be warm enough to defrost the jell, at least at the contacting surface and the warmer the food object, the heavier the coating of particles will be. Conversely, the colder the jell material, the less likelihood there will be of any individual particle becoming defrosted at the contacting surface and, hence, the coating will be lighter or less complete. Under average conditions, fifteen seconds are required for adhering and another fifteen seconds are required for rechilling.

The next step in the procedure cited is to remove the coated food objects from the excess mass of chilled jell particles before they are permitted to warm up. Thus, the particles may be scalped out of the jell either in a continuous operation or may be separated as by rapid screening from the excess comminuted jell particles in a screening operation.

The next step is the curing of the jell coating on the outside of the food object and this has been accomplished by me in several different manners. Where the object is large such as, for example, a cake with a top coating of jell material, it may be merely permitted to stand in a warm atmosphere until the jell coating has cured or at least partially cured. Where the coated food object is to be utilized as an independent confection, it is preferred that the original jell material applied to the article be already partially cured. As the coated objects are warmed, they may be rolled or tumbled in granulated sugar or the like to provide an outer coating to prevent sticking. The sugar coating, of course, has some moisture-absorptive properties which assist in the curing. I have also successfully utilized my chilled, jell-coated food objects as flavoring particles for bakery pre-mixes and, in such case, the cold coated particles are placed in the dry pre-mix before they are permitted to warm up. The coated particles are then left in undisturbed condition through the curing stage and this may include the shipping period or time prior to sale to an ultimate consumer and in accordance with the jell-curing art disclosed in my co-pending application.

A still further adaptation of the curing step lies in the selection of a food object of absorptive quality which has been dried to a low moisture content. Thus, where I utilize dried apples at 2% to 3% moisture as my edible object, the jell coating thereon, when permitted to warm to room temperature, will release some of its moisture through equalization to the dried apple center. The curing time is thus shortened whether the coated apple product be incorporated in a dry pre-mix or whether it be given an outer sugar coating as previously noted.

Where my coated edible object is incorporated in a pre-mix such as a cake mix, I find it useful to incorporate a preservative in addition to the sugar which acts as a natural mold-inhibitor. In such case, I may use benzoate of soda as set forth elsewhere in this specification, which assists greatly in preventing mold at the inner face between the coated food object and the crumb structure of the baked cake. Such additives as chopped prunes and the like are notable mold generators when incorporated in cakes and other foods having moist crumb structure. Since the preservative now lies at the outer jell coating, the preservative therein incorporated is at its highest concentration at the very point where it is needed. I have found that mold can be inhibited or even eliminated from formulae of this nature.

In the case of nuts which are subject to rancidity and infestation of insects, the coating assists to a great extent in masking insect-attracting odors and to repel infestation. As an additional aid in sealing in the essence and flavor of nuts such as almonds, I have employed the technique of forming a continuous jell coating over the nut and then drying the coating until it acquires a tough and chewy consistency. This tough shell or coating also keeps out the air and other media which may be harmful and cause deterioration of the nut. Thus, the coated nut may be employed in a pre-mix or in other foods in such a manner that the moisture present or the chemicals such as leavening agents will not have time to reach the nut through the shell before they will have become deactivated. The crisp and flavorsome quality of the nut can be preserved through the baking process in such food items as cake and the like.

In so producing food objects with a toughened jell coating, the following procedure is employed by me in the case of jell coated almonds:

Ten pounds of jell-coated almonds was mixed with seven pounds of granulated sugar and immediately placed in a conventional shelf vacuum dryer. The shelf temperature was maintained at 170° to 178° Fahrenheit and a drying vacuum of 27½ inches was applied for two hours, after which the treated almonds were removed, cooled and scalped from residual free sugar. The curvature and surface expansion of the jell coating was altered by partial melting of the jell during the initial heating operation. The retention of the melted coating in the sugar mass assisted in lending a novel appearance to the coated almond. The continued drying, of course, fixed the configuration of the coating in such a manner as to create protruding scalloped edges and to increase the entire surface area. This configuration I found to aid the suspension of the individual nut piece during its utilization in a baked cake. The additional curing and toughening of the jell coating can also be applied to the other food objects which I have specified above in order to assist in preserving them and further to render them more suitable for use in pre-mixes and as flavoring additives to other food products.

What I claim is:

1. The process of making a jell-coated edible article which consists in preparing a quantity of sticky jell-producing food, chilling the jell-producing food until it becomes frangible, comminuting the frangible chilled food and forming subdivided particles therefrom, applying the particles while still cold to the surface of a relatively warmer edible object, and simultaneously permitting the particles to become warm and adhered to the edible object.

2. The process of making a new jell-coated edible article which consists in preparing a quantity of sticky jell-producing food, chilling the jell-producing food until it becomes frangible, comminuting the frangible jell-producing food into granules, warming an edible object and adhering the granules while still cold to the surface of the warm edible object.

3. The process of making a new jell-coated edible article which consists in preparing a quantity of uncured jell-producing food, chilling the uncured jell-producing food until it becomes frangible, subdividing the frangible jell-producing food into relatively small particles, bringing into contact the particles while maintaining them in chilled condition with the surface of a relatively warmer edible object and simultaneously permitting the particles at their areas of contact to become warmed and adhered to the edible object, and curing the jell coating in place upon the article.

4. The process of making a new jell-coated edible article which consists in preparing a quantity of sticky jell-producing food, chilling the jell-producing food until it becomes frangible, comminuting the frangible jell-producing food into granules, maintaining the granules in chilled condition and applying them to the surface of a relatively warmer edible object, first permitting the granules to become warmed and adhered at their points of contact with the edible object, and then permitting the granules to continue to warm in a humid atmosphere and moistening and flowing together the granules of jell-producing food in a continuous coating over the contacted area of the edible object.

5. The process of making a new jell-coated edible article which consists in preparing a quantity of jell-producing food, chilling the jell-producing food until it becomes frangible, comminuting the frangible jell-producing food into granules, applying the granules while still cold to the surface of a relatively warmer edible object and rendering the granules sticky and adhering, then completing the curing of the jell coating at warmer temperatures.

6. The process of making a jell-coated edible article which consists in preparing a quantity of sticky jell-producing food, chilling the jell-producing food until it becomes frangible, comminuting the frangible chilled food and forming granules therefrom, warming an edible object to a temperature above that at which the jell-producing food becomes frangible, applying the granules while still cold to the surface of the warmed edible object and adhering the granules thereto, then coating the exposed surface of the granules adhered in place upon the edible object with a dry pulverulent food material.

7. The process of making a new jell coated edible article which consists in preparing a quantity of sticky jell-producing food, chilling the jell-producing food until it becomes frangible, comminuting the frangible jell-producing food into granules, warming an edible object and adhering the granules surfacewise while still cold to the warm edible object, maintaining the adhered granules in chilled and non-tacky condition while chilling the object, dusting the outer exposed surface of the adhered granules, and then permitting the articles coated with the adhered granules to warm to atmospheric conditions.

8. The process of making a new jell coated edible article which consists in preparing a quantity of uncured jell-producing food, chilling the uncured jell-producing food until it becomes frangible, subdividing the frangible jell-producing food into relatively small particles, warming a multiplicity of edible objects to a temperature above that at which the jell-producing food becomes frangible, tumbling the objects in the chilled particles and adhering particles to the contacting face of the edible objects, maintaining the outer surfaces of the adhered particles in chilled condition, applying sugar to the outer surfaces of the coated particles and permitting the mutliplicity of coated articles to warm to atmospheric conditions and curing the jell coating until it becomes relatively non-sticky.

9. The process of making a pre-mix food which consists in preparing a quantity of sticky jell-producing food, chilling the jell-producing food until it becomes frangible, comminuting the frangible jell-producing food into granules and applying while maintaining in chilled condition to the surface of a relatively warmer edible object, permitting the granules to become warmed and adhered in interfacial contact against the edible object, depositing the object and adhered granules in a dry pulverulent pre-mix, and permitting the adhered granules to warm and cure directly within the pre-mix.

10. An edible article comprising a food object having a surface coating of relatively smaller uncured jell particles adhering at random thereover.

11. An edible article comprising a food object having a surface coating adhered thereover of uncured and chilled material selected from the class of jells made from starch, pectin, gelatin, gum tragacanth, gum arabic and Irish moss.

12. The subject matter set forth in claim 11 wherein the surface coating has incorporated thereinto a preservative.

13. A pre-mix food comprising substantially dry pulverulent ingredients having dispersed throughout discrete food objects each coated with a multiplicity of incompletely cured adhering jell particles.

14. The process according to claim 4 wherein the continuous coating is dried to form a tough and protective shell over the edible object.

15. The subject matter set forth in claim 11 wherein the jell surface coating is dried and toughened to protect the food object from deterioration due to exposure of its surface.

References Cited in the file of this patent

UNITED STATES PATENTS

| | | |
|---|---|---|
| 1,737,447 | Baker et al. | Nov. 26, 1929 |
| 2,097,143 | Campbell | Oct. 26, 1937 |
| 2,191,352 | Oprean | Feb. 20, 1940 |

FOREIGN PATENTS

| | | |
|---|---|---|
| 667,114 | Great Britain | Feb. 27, 1952 |

OTHER REFERENCES

"Baker's Helper," vol. 93, issue No. 1169, May 13, 1950, pages 67–70.

"Everybody's Cookbook," by Lord, revised edition, Harcourt, Brace and Co., New York, pages 434 and 440.